(12) United States Patent
Hayashi et al.

(10) Patent No.: US 10,706,625 B2
(45) Date of Patent: Jul. 7, 2020

(54) INFORMATION PROCESSING APPARATUS, CONTROL METHOD, AND STORAGE MEDIUM STORING PROGRAM

(71) Applicant: CANON KABUSHIKI KAISHA, Tokyo (JP)

(72) Inventors: Masayuki Hayashi, Kawasaki (JP); Kazuki Takemoto, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 15/201,113

(22) Filed: Jul. 1, 2016

(65) Prior Publication Data

US 2017/0011556 A1 Jan. 12, 2017

(30) Foreign Application Priority Data

Jul. 6, 2015 (JP) .................. 2015-135540

(51) Int. Cl.
*G06T 19/00* (2011.01)
*G06T 11/60* (2006.01)
*G02B 27/01* (2006.01)
*G06T 19/20* (2011.01)
*G06T 15/40* (2011.01)

(52) U.S. Cl.
CPC .......... *G06T 19/006* (2013.01); *G02B 27/017* (2013.01); *G02B 27/0172* (2013.01); *G02B 27/0179* (2013.01); *G06T 11/60* (2013.01); *G06T 15/40* (2013.01); *G06T 19/20* (2013.01); *G02B 2027/014* (2013.01); *G02B 2027/0138* (2013.01); *G02B 2027/0185* (2013.01); *G06T 2210/21* (2013.01); *G06T 2219/2004* (2013.01); *G06T 2219/2012* (2013.01)

(58) Field of Classification Search
None
See application file for complete search history.

(56) References Cited

U.S. PATENT DOCUMENTS

| 2008/0011149 A1* | 1/2008 | Eastwood | G10H 1/368 84/612 |
| 2010/0085355 A1* | 4/2010 | Nomura | A63F 13/10 345/419 |
| 2011/0029903 A1* | 2/2011 | Schooleman | G06F 3/011 715/764 |

(Continued)

FOREIGN PATENT DOCUMENTS

| JP | H02-132573 A | 5/1990 |
| JP | 2005-293142 A | 10/2005 |

(Continued)

OTHER PUBLICATIONS

3D Tutorials AutoCAD 2009 by Kristen Kurland, 2008, all pages.*

*Primary Examiner* — Frank S Chen
(74) *Attorney, Agent, or Firm* — Canon U.S.A., Inc. IP Division (57) ABSTRACT

The apparatus draws virtual objects as an image from a predetermined point of view, determines whether the virtual objects interfere with each other, calculates the region of interference of the virtual objects determined as interfering with each other, and outputs an image in which the region of interference located behind of the virtual objects as seen from the point of view is drawn.

12 Claims, 8 Drawing Sheets

(56) References Cited

U.S. PATENT DOCUMENTS

| | | | | |
|---|---|---|---|---|
| 2012/0113223 A1* | 5/2012 | Hilliges | ............... | G06F 3/00 348/46 |
| 2013/0227493 A1* | 8/2013 | Schmidt | ............ | G06F 3/04815 715/849 |
| 2016/0071320 A1* | 3/2016 | Smith | ............... | G06T 19/006 345/633 |
| 2016/0093105 A1* | 3/2016 | Rimon | ............... | G06T 19/006 345/633 |

FOREIGN PATENT DOCUMENTS

| | | | |
|---|---|---|---|
| JP | 2006-302035 A | 11/2006 | |
| JP | 4756899 B2 | 8/2011 | |

* cited by examiner

INFORMATION PROCESSING APPARATUS, CONTROL METHOD, AND STORAGE MEDIUM STORING PROGRAM

BACKGROUND OF THE INVENTION

Field of the Invention

The present invention relates to an information processing apparatus for drawing and displaying a virtual space image, a control method, and a storage medium storing a program.

Description of the Related Art

Recently, in the field of engineering and manufacturing, a reduction in period and cost of evaluation using a prototype has been demanded. A mixed reality (MR) system has been introduced for evaluating the ease of assembly and maintenance by means of engineering data such as shape and design created on a CAD (computer-aided design).

One example of the items of an evaluation made by using a mixed reality system is a check as to whether or not it is possible to perform work without interference of a tool with any part other than the target part. In a mixed reality system for such an evaluation, when a person who tries out the system moves a virtual object (e.g., tool) to cause interference with another virtual object (e.g., part), a function of offering the visual presentation of the region of interference in a highlighted manner is sometimes demanded. A known simple way to provide such highlighted presentation is to change the display color of the region of interference into a highlight color that has been set in advance. However, in this known method, there is problem that it is not possible to visually present the region of interference in a case where the region of interference is hidden behind a virtual object that blocks the line of sight between the eyepoint of the person trying out the system and the region of interference (line-of-sight blocking object).

To solve this problem, a method of, with a change in the display color of an interfering virtual object in its entirety, generating an image of the virtual object is disclosed in Patent Publication No. 4756899. In this method, different highlight colors have been set in advance for vertices of a virtual object, and, in the event of the occurrence of interference, the region of interference is visually presented by changing the color of the virtual object in its entirety into the highlight color preset for the vertex corresponding to the region of interference. Therefore, even in a case where the region of interference is invisible from the person trying out the system, as long as at least a part of the interfering virtual object is visible, it is possible to recognize the region of interference on the basis of the relation between each vertex and the corresponding highlight color.

In a mixed reality system, the following situation can be considered: virtual objects interfere with each other, and a part or a whole of the region of interference is hidden behind a line-of-sight blocking object and is therefore invisible from the eyepoint of a person who tries out the system.

In such a situation, with a change in the display color of the region of interference into the preset highlight color alone, it is difficult to offer the visual presentation of the region of interest to the person trying out the system.

The technique disclosed in Patent Publication No. 4756899 makes it possible to recognize the region of interference even if the region of interference is hidden, achieved by, as long as a part of the virtual object is visible, changing the display color of the virtual object in its entirety. However, nothing is disclosed in this publication about visualization of the region of interference itself. Moreover, if no part of the virtual object is visible, it is not possible to visually present the region of interest.

SUMMARY OF THE INVENTION

An information processing apparatus according to some aspect of the present invention comprises: a virtual object drawer configured to draw virtual objects as an image seen from a predetermined point of view; an interference determiner configured to determine whether the virtual objects drawn by the virtual object drawer interfere with each other; an interference region deriver configured to derive a region of interference of the virtual objects determined as interfering with each other by the interference determiner; and an image outputter configured to output an image in which the region of interference located behind of the virtual objects as seen from the point of view is drawn.

With these features disclosed in detail in this specification, it is possible to offer the visual presentation of the region of interference even when there exists any virtual object that blocks the line of sight between the eyepoint of a person who tries out a system and the region of interference.

Further features of the present invention will become apparent from the following description of exemplary embodiments with reference to the attached drawings.

DESCRIPTION OF THE EMBODIMENTS

With reference to the accompanying drawings, exemplary embodiments of the present invention will now be explained.

First Embodiment

Figure 1:
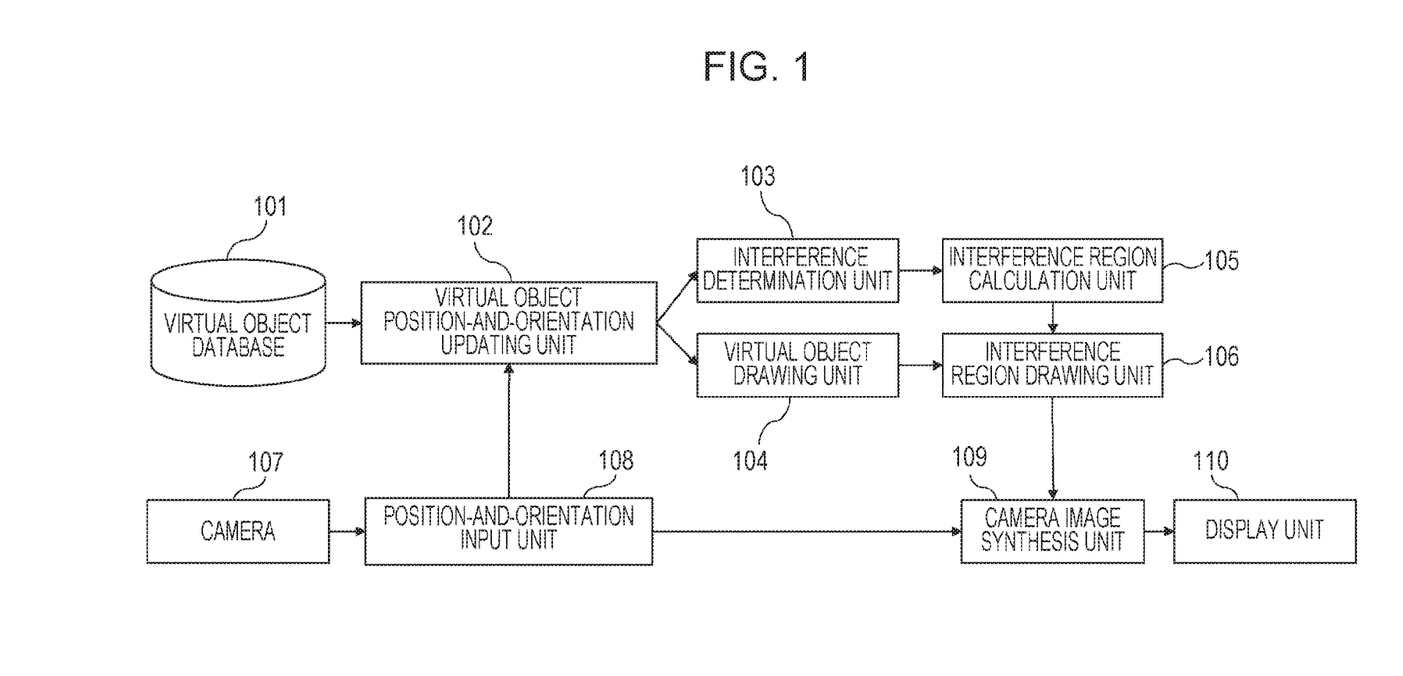
FIG. 1 is a block diagram that illustrates the functional configuration of an information processing apparatus according to a first embodiment.

FIG. 1 is a block diagram that illustrates the functional configuration of an information processing apparatus according to a first embodiment.

An information processing apparatus according to the present embodiment draws a virtual space image, synthesizes the virtual space image with a real space image captured with a camera 107, and displays the result of synthesis as mixed reality video on a display unit 110.

A virtual object database 101 is a database in which virtual object models are stored. The virtual object model includes, for example, shape, display color, and initial position and orientation.

The camera 107 acquires an image of a real space by shooting, and inputs it into the information processing apparatus.

A position-and-orientation input unit 108 estimates the position and orientation of the camera 107 in the real space on the basis of the real space image captured with the camera 107. In the present embodiment, it is assumed that the position and orientation of the camera 107 coincides with the position and orientation of the eyepoint of a person who tries out the system. Though not illustrated in the drawings, in the real space, there exist markers placed for determining the position and orientation of virtual objects, and the person trying out the system can change the position and orientation of the virtual objects by moving the markers. When the present invention is put into practical application, the method of determining the position and orientation of the eyepoint of the person trying out the system is not limited to the method described here. The same holds true for the position and orientation of virtual objects.

On the basis of the position and orientation of the eyepoint of the person trying out the system and the position and orientation of the virtual objects, which are inputted from the position-and-orientation input unit 108, a virtual object position-and-orientation updating unit 102 place the virtual eyepoint and the virtual objects to construct a virtual space. In the present embodiment, the shape of a virtual object is expressed as a set of three-dimensional vertices and a set of triangular polygons connecting the vertices. Therefore, the virtual object position-and-orientation updating unit 102 converts the coordinate value of each of the vertices of each of the virtual objects into a coordinate value in a three-dimensional coordinate system that has the origin at the optical center of the camera 107.

A virtual object drawing unit 104 draws virtual objects as an image viewed from the virtual eyepoint. When a three-dimensional virtual object is drawn, hidden-line/hidden-surface removal processing is performed. Hidden-line/hidden-surface removal is a technique for correctly expressing an anteroposterior relationship, for example, between virtual objects as to which one of the two is in front of the other, by not drawing lines and surfaces (faces) that are supposed to be invisible.

An interference determination unit 103 determines whether virtual objects interfere with each other (or one another) or not on the basis of the position and orientation of the virtual objects and the shape thereof. To determine whether two virtual objects interfere with each other or not, the following procedure is taken. First, one triangular polygon is taken out of each of the virtual objects. It is determined whether the two triangular polygons intersect with each other or not. This processing is performed for all combinations of triangular polygons. If there is at least one intersecting combination, it is determined that the two virtual objects interfere with each other. This procedure is repeated for all combinations of all virtual objects. When the present invention is put into practical application, the method of interference determination is not limited to the method described here.

An interference region calculation unit 105 calculates the region of interference of the virtual objects determined as interfering with each other by the interference determination unit 103. In the present embodiment, the region of interference is expressed as a set of intersecting triangular polygons and a set of lines of intersection. When the present invention is put into practical application, the method of calculating the region of interference is not limited to the method described here.

An interference region drawing unit 106 draws, in a superposed manner, the region of interference calculated by the interference region calculation unit 105 on the image drawn by the virtual object drawing unit 104. When the interference region drawing processing is performed, all regions of interference are drawn irrespective of an anteroposterior relationship with the virtual objects by disabling the hidden-line/hidden-surface removal processing. That is, as viewed from the virtual eyepoint, the region of interference is drawn in front of the virtual objects drawn by the virtual object drawing unit 104.

In the present embodiment, as the method of drawing the region of interference, a set of lines of intersection is drawn in a preset line style. The preset line style means color, line width, and pattern (line type), etc. For example, the line of intersection of the region of interference of virtual objects is rendered in red bold for highlighting. This is called as highlight display of the region of interference. With the highlight display, the person trying out the system can visually recognize the region of interference.

A camera image synthesis unit 109 synthesizes the virtual space image drawn by the virtual object drawing unit 104 and the interference region drawing unit 106 with the real space image captured with the camera 107. The display unit 110 is a video see-through HMD (Head Mounted Display) that can perform stereoscopic 3D display. An HMD is provided with a pair of cameras and a pair of displays, one for the left eye and the other for the right eye. Therefore, the camera 107, the virtual object drawing unit 104, the interference region drawing unit 106, and the camera image synthesis unit 109 produce a left-eye image and a right-eye image. The display unit 110 is not limited to an HMD.

In the present embodiment, a mixed reality system that synthesizes a virtual space image with a real space image to produce mixed reality video is taken as an example. However, the scope of the present invention is not limited to the disclosed system. The present invention may be applied to other information processing apparatus that draws a virtual space image.

Figure 2:
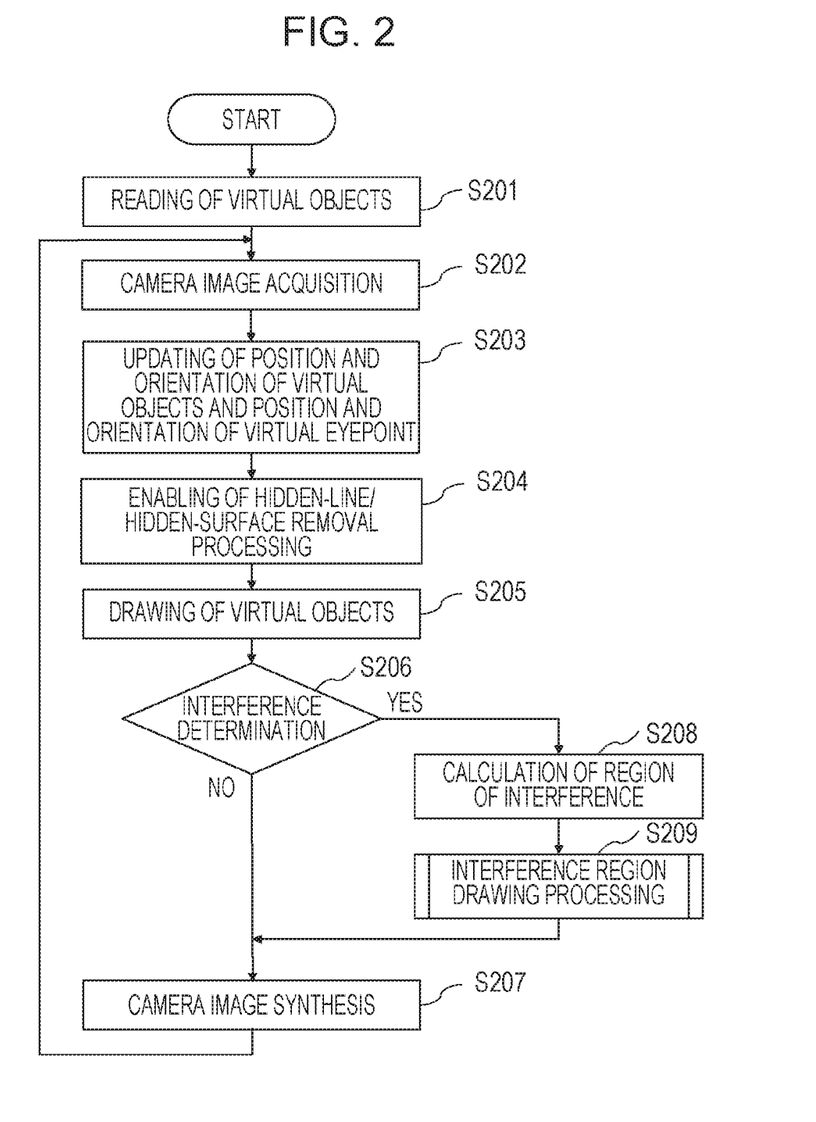
FIG. 2 is a flowchart that illustrates a series of processing of an information processing apparatus according to the first embodiment.
Figure 4A:
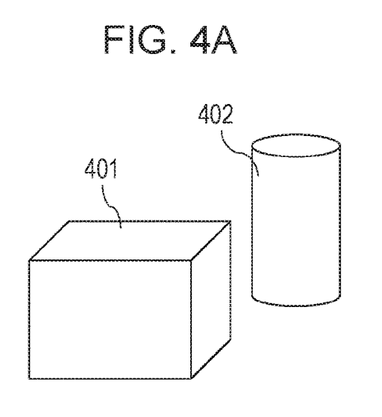
FIG. 4A is a schematic view of an example of a virtual space image.

A series of processing of an information processing apparatus according to the first embodiment is illustrated in FIG. 2. An example of a virtual space image is illustrated in FIG. 4. In the following description, as illustrated in FIG. 4A, a case where a box-shaped virtual object 401 and a column-shaped virtual object 402 are arranged is taken as an example.

In a step S201, the information processing apparatus reads the models of the virtual objects 401 and 402 out of the virtual object database 101.

In a step S202, the information processing apparatus receives an input of a real space image captured with the camera 107.

In a step S203, the virtual object position-and-orientation updating unit 102 reflects marker information onto the position and orientation of the virtual eyepoint and the position and orientation of the virtual objects 401 and 402, wherein the marker information is inputted from the position-and-orientation input unit 108 for determining the position and orientation of the camera 107 and the position and orientation of the virtual objects 401 and 402.

In a step S204, the virtual object drawing unit 104 enables determination using a depth buffer (Z buffer), which is commonly used hidden-line/hidden-surface removal processing. In a step S205, the virtual object drawing unit 104 draws the virtual objects 401 and 402. Therefore, when the processing of drawing the virtual objects 401 and 402 is performed, it is determined on a pixel-by-pixel basis whether the depth value of the virtual object 401, 402 on a pixel is less than the value stored for the pixel in the depth buffer or not, and the virtual object 401, 402 is drawn on the pixel only in a case where said virtual depth value is less than said stored value. In addition, the depth value of the pixel in the depth buffer is updated. As a result of the processing described above, an image corresponding to FIG. 4A is drawn. When the present invention is put into practical application, the hidden-line/hidden-surface removal processing is not limited to determination using a depth buffer.

In the present embodiment, the virtual eyepoint in the virtual space coincides with the position and orientation of the camera 107 in the real space. This is because it is assumed that the position and orientation of the eyepoint of the person trying out the system in the real space coincides with the position and orientation of the camera 107.

In the real space, there exist markers placed for determining the position and orientation of the virtual objects 401 and 402 respectively, and the person trying out the system can change the position and orientation of the virtual objects 401 and 402 by moving the markers.

Figure 4B:
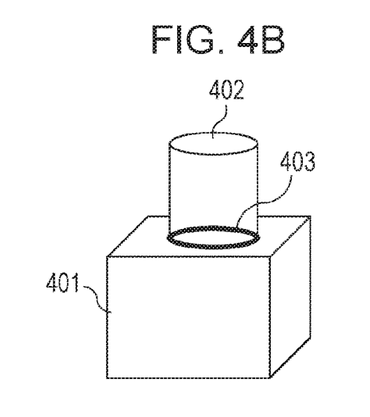
FIG. 4B is a schematic view of an example of a virtual space image.

In a step S206, the interference determination unit 103 determines whether the virtual objects 401 and 402 interfere with each other or not on the basis of the position and orientation of the virtual objects 401 and 402 and the shape thereof updated by the virtual object position-and-orientation updating unit 102. If the two interfere with each other, the process proceeds to a step S208. If not, the process proceeds to a step S207. FIG. 4B illustrates a state of interference in which the virtual object 402 interferes with the virtual object 401 as a result of the movement of the marker corresponding to the virtual object 402 by the person trying out the system from the state illustrated in FIG. 4A.

In the step S208, the interference region calculation unit 105 calculates the region of interference of the virtual objects 401 and 402 determined as interfering with each other by the interference determination unit 103.

In a step S209, the interference region drawing unit 106 performs interference region drawing processing. After that, the process proceeds to the step S207.

Figure 3:
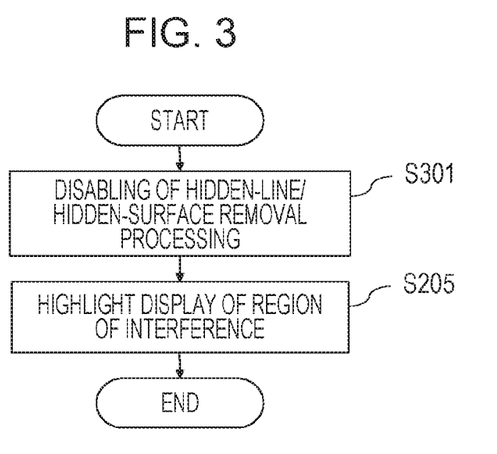
FIG. 3 is a detailed flowchart of interference region drawing processing according to the first embodiment.

With reference to FIG. 3, the interference region drawing processing performed in the step S209 will now be explained in detail.

In a step S301, the hidden-line/hidden-surface removal processing using the depth buffer is disabled. Therefore, in graphics drawn in subsequent steps, all lines and surfaces are drawn in a superposed manner on the image that has already been drawn, without taking the anteroposterior relationship into consideration.

In a step S302, the processing of rendering the line of intersection of the region of interference (borderline) in bold and preset color is applied to the image drawn in the step S205. As a result of this processing, a superposition-processed image with highlight display 403 of the region of interference on the virtual objects 401 and 402 is generated as illustrated in FIG. 4B. In this image, the lower part of the virtual object 402 is not drawn because of the hidden-line/hidden-surface removal processing, in which its anteroposterior relationship with the virtual object 401 is taken into consideration. In contrast, in the highlight display 403 of the region of interference, all lines are drawn, including the part (upper half) that would be otherwise hidden by the virtual object 402. By this means, it is possible to offer the visual presentation of the region of interference, and the person trying out the system can easily understand the region of interference.

Referring back to FIG. 2, in the step S207, the camera image synthesis unit 109 synthesizes, with the real space image captured with the camera 107, the image of the virtual objects 401 and 402 together with the highlight display 403 of the region of interference. The synthesized image is displayed on the display unit 110. After that, the process returns to the step S202, and the series of processing in the subsequent steps is repeated. In this way, it is possible to present, to the person trying out the system, mixed reality video based on successive execution of real space shooting and superposition of a virtual space image on a camera-shot image.

In the present embodiment, an HMD that can perform stereoscopic display is used as the display unit 110. Therefore, the steps S202 to S209 are executed for each of the left eye and the right eye. This makes it possible for the person trying out the system with the wearable HMD to enjoy 3D mixed reality video based on binocular disparity. When the highlight display 403 of the region of interference is performed, the hidden-line/hidden-surface removal processing using the depth buffer is disabled. For this reason, with the 2D image alone, without a hint by the line/surface that would be otherwise hidden, there is a possibility that it might be difficult to understand the anteroposterior relationship with the virtual object. This is why an HMD, in which, because of the use of stereoscopic 3D vision, depth perception based on binocular parallax provides a clue to the understanding of the anteroposterior relationship, is suitable.

Figure 4C:
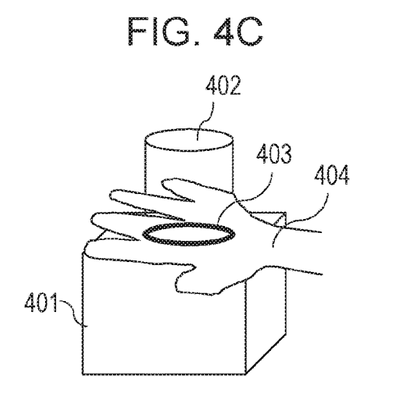
FIG. 4C is a schematic view of an example of a virtual space image.

Next, with reference to FIG. 4C, a state in which there exists a virtual object that blocks the line of sight between the eyepoint of the person trying out the system and the region of interference (line-of-sight blocking object) will now be explained. In the example described below, the line-of-sight blocking object 404 is a virtual model of the hand of a person who tries out the system. Since the line-of-sight blocking object 404 is also a virtual object, it is drawn in the step S205 of the flowchart in FIG. 2 similarly to the virtual objects 401 and 402. That is, the hidden-line/hidden-surface removal processing using the depth buffer is enabled and, therefore, a part of the virtual objects 401 and 402, or more specifically, the part behind the line-of-sight blocking object 404, is not drawn. On the other hand, since the hidden-line/hidden-surface removal processing is disabled for the highlight display 403 of the region of interference of the virtual objects 401 and 402, it is in front of all of the virtual objects. By this means, it is possible to offer the visual presentation of the region of interference as illustrated in FIG. 4C, and the person trying out the system can easily understand the region of interference.

Figure 4D:
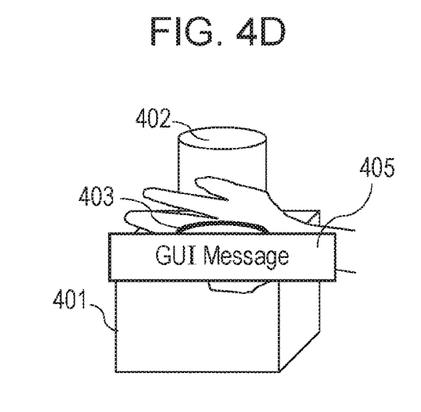
FIG. 4D is a schematic view of an example of a virtual space image.

Next, with reference to FIG. 4D, a state of GUI-superposed display (display with graphical user interface) that is performed if necessary when the image generated by the camera image synthesis unit 109 is displayed on the display unit 110 will now be explained. As illustrated in FIG. 4D, it is assumed here that there is an overlap between the display area of GUI 405 and the area of the highlight display 403 of the region of interference. The GUI 405 is displayed in front of the highlight display 403 of the region of interference, which is in front of the virtual objects. This can be realized by displaying the GUI 405 in a superposed manner on the image generated by the camera image synthesis unit 109. When the present invention is put into practical application, the information displayed at the frontmost position is not limited to GUI. When information that is of greater importance to a person who tries out the system than virtual objects is displayed on the screen, the frontmost information display can be obtained by superposing the information on the image generated by the camera image synthesis unit 109.

Figure 11:
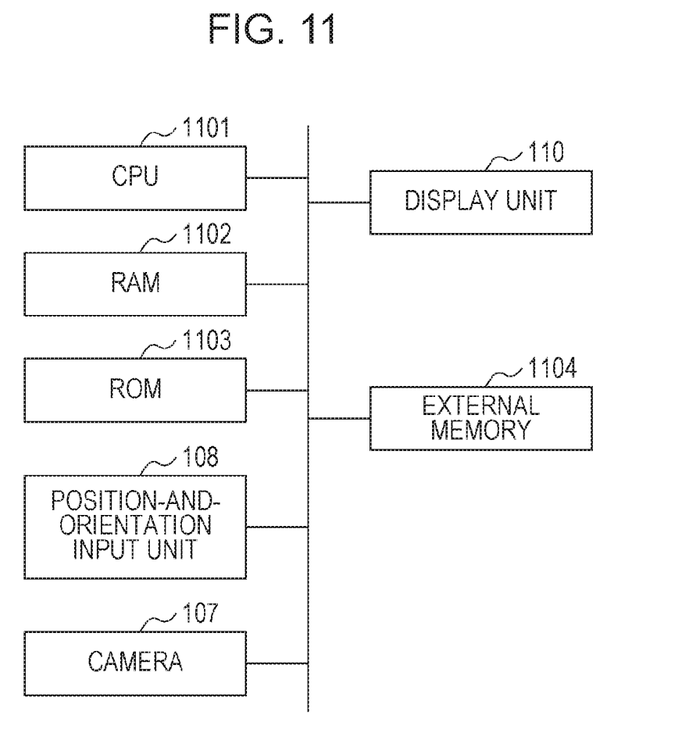
FIG. 11 is a block diagram that illustrates an example of hardware configuration for realizing an information processing apparatus according to an exemplary embodiment.

FIG. 11 is a block diagram that illustrates an example of hardware configuration for realizing an information processing apparatus according to the present embodiment. In FIG. 11, the same reference numerals are assigned to components that are the same as those of FIG. 1. They are not explained here.

The numeral 1101 denotes a CPU. The CPU 1101 controls the entire operation of the apparatus. The numeral 1102 denotes a RAM. The RAM 1102 is used as a workspace when the CPU 1101 performs processing while controlling the components. The numeral 1103 denotes a ROM. A control program, various application programs, and data, etc. are stored in the ROM 1103. The CPU 1101 reads the control program out of the ROM 1103 into the RAM 1102, and runs it, thereby configuring the virtual object position-and-orientation updating unit 102, the interference determination unit 103, the virtual object drawing unit 104, the interference region calculation unit 105, and the interference region drawing unit 106, etc. illustrated in FIG. 1. The numeral 1104 denotes an external memory. The virtual object database 101 is in the external memory 1104.

First Variation Example

In the first embodiment, the line of intersection of the region of interference is rendered in a preset line style (for example, in red bold). However, the method of highlight display is not limited to the foregoing example. For example, different line styles such as a line style for rendering a hidden line and another line style for rendering other line (non-hidden line) may be applied.

Figure 5:
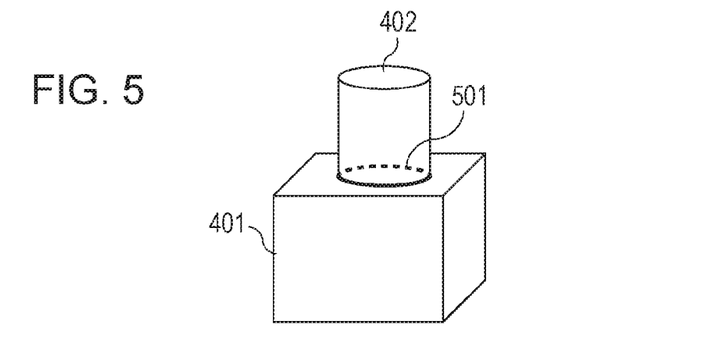
FIG. 5 is a schematic view of an example of a virtual space image.

A method for highlight display 501 of the region of interference illustrated in FIG. 5, in which the hidden line is rendered as a dotted line, and the non-hidden line as a solid line, will now be explained. The illustrated modified highlight display is realized by enabling the following processing instead of disabling the hidden-line/hidden-surface removal processing using the depth buffer in the step S301.

When the processing of highlight display of the region of interference is performed, it is determined on a pixel-by-pixel basis whether the depth value of the virtual object on a pixel is less than the value stored for the pixel in the depth buffer (meaning that the pixel is a part of the non-hidden line) or not, and a first style is applied to the pixel if said virtual depth value is less than said stored value. If not (meaning that the pixel is a part of the hidden line), a second style is applied to the pixel. As a result of this processing, the hidden line and the non-hidden line are rendered in different styles as in the highlight display 501 for the virtual objects. The term "style" as used herein means a combination of color, line width, and pattern (line type), etc., and the first and second styles have been set in advance.

The rendering of a hidden line and a non-hidden line in different styles as in the above example provides a clue to the understanding of an anteroposterior relationship. It can be expected that this will make the region of interference easier to recognize.

Second Variation Example

Figure 6:
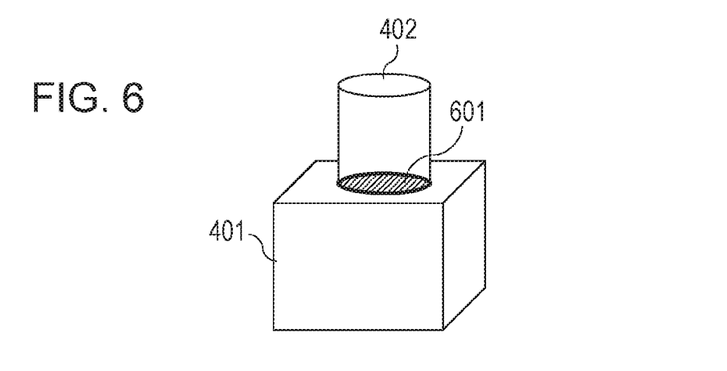
FIG. 6 is a schematic view of an example of a virtual space image.

In the first embodiment, the line of intersection of the region of interference is rendered in a preset line style (for example, in red bold). However, the method of highlight display is not limited to the foregoing example. For example, in addition to, or instead of, the rendering of the line of intersection of the region of interference in the form of a line or lines, it may be rendered in the form of a surface area. As in highlight display 601 in FIG. 6, with the highlighting of the surface area encircled by the line of intersection in addition to the highlighting of the line of intersection, it can be expected that the region of interference will be easier to notice.

Instead of presetting the line/surface style (color, line width, pattern, etc.) for highlight display, it may be determined dynamically on the basis of the display color or pattern of the virtual objects interfering with each other. The only thing necessary for this modification is to add a highlight display style determination unit between the interference determination unit 103 and the interference region drawing unit 106. The highlight display style determination unit determines, for example, the complementary color of the display color of the virtual object as the color of highlight display. It can be expected that this will make the difference between the display color of the virtual object and the color of the highlight display of the region of interference clearer.

Second Embodiment

A second embodiment will now be explained. The same configuration and processing as those of the first embodiment are not explained in detail here. The focus of the description will be on the point of difference from the first embodiment.

Figure 8A:
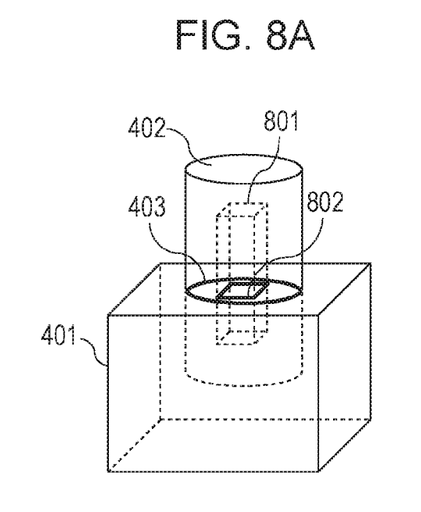
FIG. 8A is a schematic view of an example of a virtual space image.

In the first embodiment, highlight display is performed for the entire region of interference calculated by the interference region calculation unit 105. However, the scope of the present invention is not limited to the foregoing example. In the description below, a state illustrated in FIG. 8A is taken as an example. There are two virtual objects 402 and 801 interfering with the virtual object 401. The virtual object 801 is "included" in, that is, located completely inside, the virtual object 402. For easier understanding, in FIG. 8A, all hidden lines of the virtual objects 401, 402, and 801 are shown as dotted lines.

In FIG. 8A, for highlight display for all regions of interference similarly to highlight display for the entire region of interference in the first embodiment, highlight display 403 and highlight display 802 are on the screen. However, since the virtual object 801 is included in the virtual object 402, all of the lines and surfaces of the virtual object 801 are hidden lines and hidden surfaces. Therefore, they are not drawn by the virtual object drawing unit 104. For this reason, the highlight display 802 of the region of interference only is visually presented to the person trying out the system. Such highlight-only display might make the person trying out the system feel something wrong.

In the present embodiment, an example of reducing such a feeling of strangeness by presenting the highlight display 403 only to the person trying out the system, without the highlight display 802 of the region of interference, is described.

Figure 7:
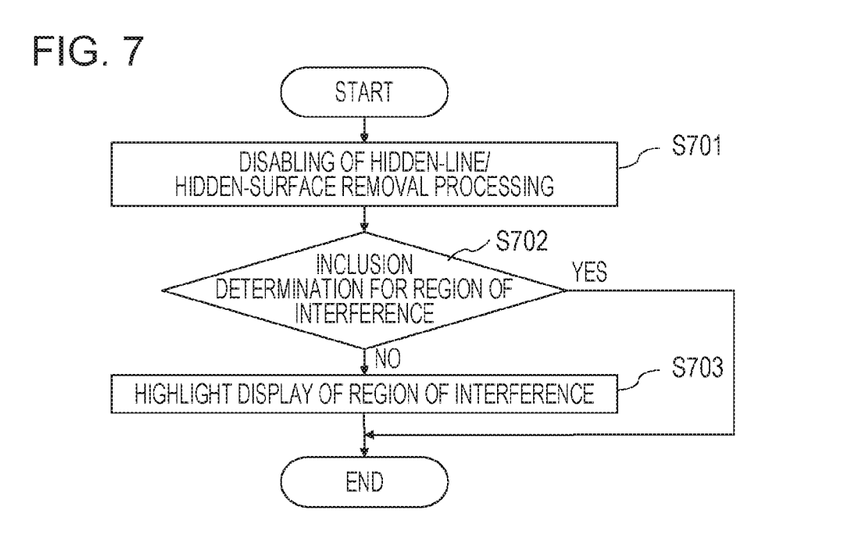
FIG. 7 is a detailed flowchart of interference region drawing processing according to a second embodiment.

The strangeness reduction can be realized by replacing the interference region drawing processing in the step S209 of the flowchart in FIG. 2 with the flowchart in FIG. 7.

The processing performed in a step S701 is the same as that of the step S301.

In a step S702, the interference region calculation unit 105 performs inclusion determination processing for the calculated region of interference. In the present embodiment, the region of interference is expressed as a set of triangular polygons and a set of lines of intersection. The inclusion determination processing is performed for each triangular polygon of the region of interference. For the purpose of judging whether a certain triangular polygon is included in a virtual object or not, AABB (Axis-Aligned Bounding Box) that approximates the shape of the virtual object is used. AABB is a box whose edges are parallel to the X, Y, and Z axes in a three-dimensional space, with the smallest measure within which all of the vertices of a virtual object lie. In a case where all of the vertices of a certain triangular polygon lie within the AABB of a certain virtual object, it is determined that the triangular polygon is included in the virtual object. When the present invention is put into practical application, the method of inclusion determination is not limited to the method described here.

In a step S703, on the basis of the result of inclusion determination in the step S702, the highlight display of the region of interference is performed if a certain triangular polygon is not included in any of the virtual objects determined as interfering with each other by the interference determination unit 103, or the highlight display of the region of interference is not performed if the triangular polygon is included in at least one of these interfering virtual objects.

Figure 8B:
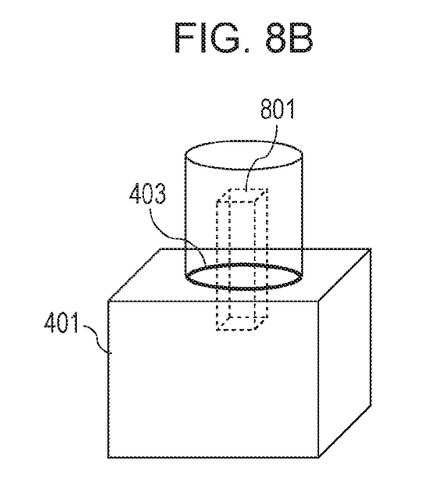
FIG. 8B is a schematic view of an example of a virtual space image.

With the above processing, it is possible to eliminate the highlight display 802 of the region of interference for the virtual object 801, which is included in the virtual object 402, as illustrated in FIG. 8B. For easier understanding, in FIG. 8B, all hidden lines of the virtual object 801 are shown as dotted lines.

Third Embodiment

A third embodiment will now be explained. The same configuration and processing as those of the first embodiment are not explained in detail here. The focus of the description will be on the point of difference from the first embodiment.

Figure 10A:
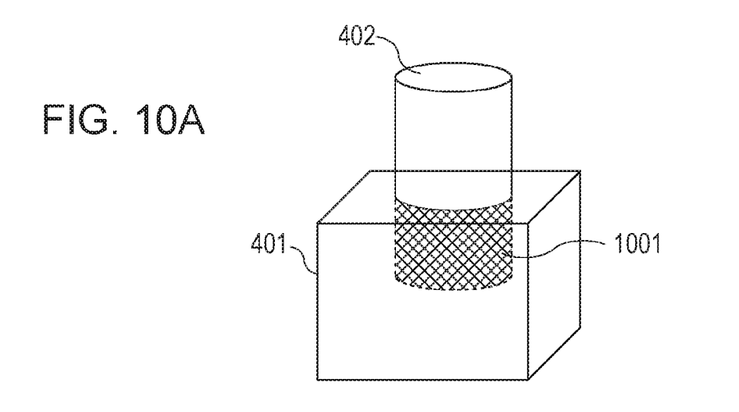
FIG. 10A is a schematic view of an example of a virtual space image.

In the first embodiment, line-based rendering or surface-area-based rendering is applied to the line of intersection. However, the scope of the present invention is not limited to the foregoing example. For example, as illustrated in FIG. 10A, non-transparent rendering or semi-transparent rendering may be used for visualizing the shape of the region of interference.

Figure 9:
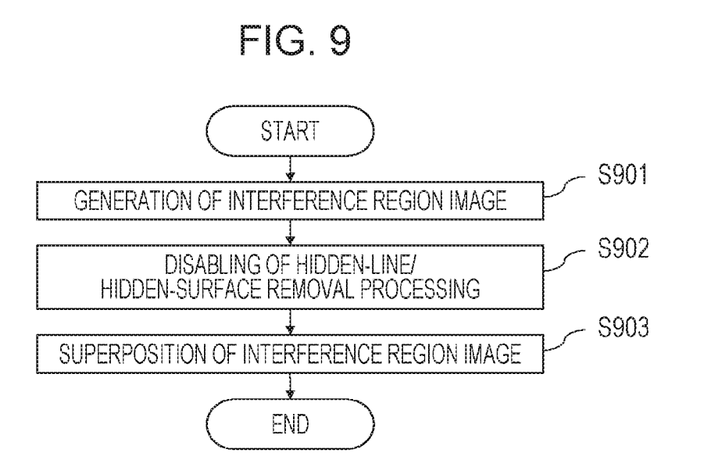
FIG. 9 is a detailed flowchart of interference region drawing processing according to a third embodiment.

In the present embodiment, this can be realized by replacing the interference region drawing processing in the step S209 of the flowchart in FIG. 2 with the flowchart in FIG. 9.

Figure 10B:
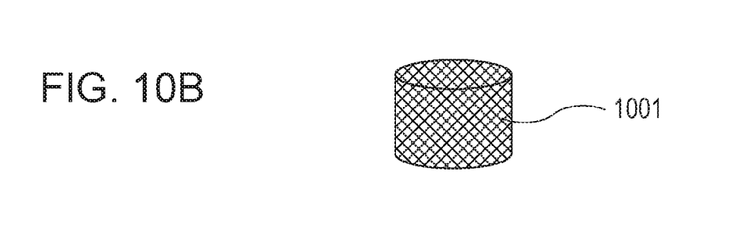
FIG. 10B is a schematic view of an example of a virtual space image.

In a step S901, as illustrated in FIG. 10B, an image 1001 for visualizing the shape of the region of interference calculated by the interference region calculation unit 105 (hereinafter referred to as "interference region image") is generated. Since the hidden-line/hidden-surface removal processing enabled in the step S204 remains valid in this step, the interference region image 1001 generated here is a "hidden-processed" image.

In a step S902, the hidden-line/hidden-surface removal processing is disabled.

In a step S903, the interference region image 1001 generated in the step S903 is superposed in a non-transparent state or in a semi-transparent state on the image of the virtual objects drawn in the step S205.

As a result of the above processing, the shape of the region of interference is visualized non-transparently or semi-transparently as illustrated in FIG. 10A. By this means, it is possible to offer the visual presentation of the region of interference, with the visualization of its shape, and the person trying out the system can easily understand the region of interference.

In the present embodiment, instead of presetting the style of the interference region image 1001, it may be determined dynamically on the basis of the display color or pattern of the virtual objects interfering with each other.

Though the specific concept of the present invention has been described with exemplary embodiments, the embodiments merely illustrate examples for implementing the present invention, and the technical scope of the present invention shall not be construed limitedly from these examples. That is, the present invention can be implemented in a variety of modes without departing from its technical spirit or principal features.

For example, highlight display for highlighting the line of intersection of the region of interference described in the first or second embodiment may be combined with the interference region image of the third embodiment.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-135540, filed Jul. 6, 2015, which is hereby incorporated by reference herein in its entirety.

What is claimed is:

1. An information processing apparatus, comprising:
a memory storing instructions; and
a processor which is capable of executing the instructions causing the information processing apparatus to:
draw virtual objects as an image seen from a viewpoint corresponding to a set of position and orientation of a head mounted display held by a user;
determine whether a first object and a second object of the drawn virtual objects collide with each other;
derive, in a case where it is determined that the first object and the second object collide with each other, a contour line formed by collision of outer surfaces of the first object and the second object;
draw the contour line, the drawn contour line including a part hidden from the viewpoint by the first object or the second object;
generate a display image by combining the drawn virtual objects, the drawn contour line, and a captured image of a physical space where the user is,
in a case where, seen from the viewpoint, a virtual hand object which represents a hand of the user hides the collision of the first object and the second object, the first object, the second object, and the virtual hand object, are displayed, in back of the drawn contour line, and a virtual message object which represents message to the user is displayed in front of the drawn contour line, in the display image; and
output the display image to the head mounted display.

2. The information processing apparatus according to claim 1,
wherein the contour line is drawn without applying hidden-line removal processing and/or hidden-surface removal processing thereto, and wherein said hidden-line removal processing and/or hidden-surface removal processing is processing to not draw one or more of the virtual objects that are invisible from the viewpoint.

3. The information processing apparatus according to claim 1,
wherein the contour line is drawn by using a line or using a surface, or both.

4. The information processing apparatus according to claim 3, wherein the processor capable of executing the instructions further causes the information processing apparatus to:
determine a style of the line or the surface, or both, used for drawing the contour line, depending on property of the virtual objects determined as colliding with each other.

5. The information processing apparatus according to claim 4,
wherein the processor capable of executing the instructions further causes the information processing apparatus to determine a color that is different from a color of the virtual objects determined as colliding with each other as a color of the line or the surface, or both, used for drawing the contour line.

6. The information processing apparatus according to claim 1,
wherein the processor capable of executing the instructions further causes the information processing apparatus to draw a line of intersection of the contour line by applying different line styles.

7. The information processing apparatus according to claim 6,
wherein the different line styles comprise a first line style for rendering a hidden line and a second line style for rendering another line thereto.

8. The information processing apparatus according to claim 1,
wherein, when it is determined that the second object of the virtual objects and a third object of the virtual objects collide with the first object of the virtual objects and, when it is determined that the third virtual object is included in the second virtual object, the line formed by collision of outer surfaces of the first virtual object and the third virtual object is not drawn.

9. The information processing apparatus according to claim 1,
wherein the image outputted is obtained by synthesizing a shot image of a physical space with the virtual objects.

10. The information processing apparatus according to claim 1,
wherein the head mounted display is wearable on a head of a user.

11. A method for controlling an information processing apparatus, comprising:
virtual object drawing, in which virtual objects are drawn as an image seen from a predetermined viewpoint corresponding to a set of position and orientation of a head mounted display held by a user;
interference determination, in which it is determined whether a first object and a second object of the virtual objects drawn in the virtual object drawing collide with each other;
contour line deriving, in a case where it is determined that the first object and the second object collide with each other, in which a contour line formed by collision of outer surfaces of the first object and the second objects is derived;
contour line drawing, in which the contour line is drawn, the drawn contour line including a part hidden from the viewpoint by the first object or the second object;
display image generating, in which a display image is generated by combining the drawn virtual objects, the drawn contour line, and a captured image of a physical space where the user is,
in a case where, seen from the viewpoint, a virtual hand object which represents a hand of the user hides the collision of the first object and the second object, the first object, the second object, and the virtual hand object, are displayed, in back of the drawn contour line, and a virtual message object which represents message to the user is displayed in front of the drawn contour line, in the display image; and image outputting, in which the display image is outputted to the head mounted display.

12. A non-transitory computer-readable storage medium storing instructions that, when executed by a processor, causes a computer to:
   draw virtual objects as an image seen from a predetermined viewpoint corresponding to a set of position and orientation of a head mounted display held by a user;
   determine whether a first object and a second object of the drawn virtual objects collide with each other;
   derive, in a case where it is determined that the first object and the second object collide with each other, a contour line formed by collision of outer surfaces of the first object and the second object;
   draw the contour line, the drawn contour line including a part hidden from the viewpoint by the first object or the second object;
   generate a display image by combining the drawn virtual objects, the drawn contour line, and a captured image of a physical space where the user is,
   in a case where, seen from the viewpoint, a virtual hand object which represents a hand of the user hides the collision of the first object and the second object, the first object, the second object, and the virtual hand object, are displayed, in back of the drawn contour line, and a virtual message object which represents message to the user is displayed in front of the drawn contour line, in the display image; and
   output the display image to the head mounted display.

* * * * *